United States Patent
Akazawa et al.

(10) Patent No.: US 6,924,815 B2
(45) Date of Patent: Aug. 2, 2005

(54) IMAGE GENERATING SYSTEM AND IMAGE GENERATION METHOD FOR THE SAME

(75) Inventors: Tsutomu Akazawa, Tokyo (JP); Norio Ishii, Tokyo (JP); Kenichi Imaeda, Tokyo (JP)

(73) Assignee: Sega Corporation, Tokyo (JP)

( * ) Notice: Subject to any disclaimer, the term of this patent is extended or adjusted under 35 U.S.C. 154(b) by 161 days.

(21) Appl. No.: 10/265,438

(22) Filed: Oct. 7, 2002

(65) Prior Publication Data

US 2003/0071820 A1 Apr. 17, 2003

(30) Foreign Application Priority Data

Oct. 11, 2001 (JP) .......................... 2001-314435

(51) Int. Cl.[7] .......................... G09G 5/00; G06T 15/50; G06T 15/60
(52) U.S. Cl. .......................... 345/582; 345/426; 345/552
(58) Field of Search .......................... 345/582, 583, 345/584, 585, 586, 426, 419, 552

(56) References Cited

U.S. PATENT DOCUMENTS

| | | | | |
|---|---|---|---|---|
| 5,740,343 A | * | 4/1998 | Tarolli et al. | 345/587 |
| 6,034,691 A | * | 3/2000 | Aono et al. | 345/582 |
| 6,281,904 B1 | * | 8/2001 | Reinhardt et al. | 345/582 |
| 2002/0118209 A1 | * | 8/2002 | Hylen | 345/582 |

* cited by examiner

Primary Examiner—Kee M. Tung
Assistant Examiner—Aaron M Richer
(74) Attorney, Agent, or Firm—Dickstein Shapiro Morin & Oshinsky

(57) ABSTRACT

A graphical system includes a first, second, and third controllers. The first controller stores a first texture in texture memory. The second controller generates as a second texture, images of environment things except ambient light emitting sources. The second controller also generates as a third texture images of light emitting sources and shadows of certain environmental things. A third controller reads the first, second, and third textures and maps a synthesized texture to an object.

8 Claims, 7 Drawing Sheets

IMAGE GENERATING SYSTEM AND IMAGE GENERATION METHOD FOR THE SAME

BACKGROUND OF THE INVENTION

1. Field of the Invention

The present invention relates to an image generating system and an image generation method.

2. Description of the Related Arts

Conventionally, there has been an image generating system which can give a feeling of virtual reality, by means of converting an object observed from a virtual viewpoint, in a three-dimensional virtual space, into image data having two-dimensional coordinates, and displaying the data on a display unit.

When such an image generating system is applied as a game machine, with which the player can enjoy playing, for example, a racing game, the player can drive a racing car, which is the object, and run throughout the space. Further, the player can take part in a virtual reality car racing against a racing car driven by another player.

At this time, it is important to give a feeling of further sophisticated virtual reality to the player, in order to encourage the player to keep his interest in playing games with a game machine, thereby forcing the player to select his preferable program to execute the game.

One of the factors for giving a feeling of even more sophisticated virtual reality to the player is to reflect the environment surrounding the object into the image of the object (in the above example, a racing car) placed in a three-dimensional virtual space. In other words, the environment surrounding the object is superimposed on the image of the object.

As a technology for this purpose, there is the invention, for example, as disclosed in Japanese Patent Application Laid-Open (kokai) No. 2001-70633.

Such an invention as disclosed in Patent Laid-Open is to map the environmental texture, that should be visible in the upward direction viewed from the object (for example, a racing car), on the object from the upward direction of the object, not depending on the position or rotational angle of the virtual camera. And, the environmental texture is pre-rendered to the texture memory, like the texture of the object itself. By this pre-rendering, reflection of light emitting sources, etc. can be expressed naturally.

As described above, in the invention disclosed in Japanese Patent Application Laid-Open (kokai) No. 2001-70633, the texture of the surrounding environment to be reflected into the image of the object is pre-rendered to the memory.

Therefore, it is difficult to promptly reflect a change with time to the texture to be reflected, in accordance with the time change of the object, which is subject to reflection (for example, a car) and reflecting things (all environmental things surrounding the car, such as light emitting sources, landscape, etc.) (change in the environmental image with the move of the car).

Furthermore, for example, in a racing game, etc., the car appearing on the screen is desirably able to give a feeling of reality in the expression of its painted body, including brightness and luster, when reflection is made on the car.

SUMMARY OF THE INVENTION

From the above-mentioned viewpoint, an object of the present invention is to provide an image generating system and an image generation method, which can promptly reflect the environment onto the object depending on the change with time, giving a feeling of reality, and also can allow expression with more reality of the object, including luster, when light emitting sources are reflected onto the object.

In order to achieve the above object, according to a first aspect of the present invention there is provided an image generating system comprising a texture memory for storing therein textures to be mapped on the surface of an object placed in a three-dimensional virtual space; first controller for reading original patterns of the object as a first texture from a record medium, the first controller storing the read first texture into the texture memory; second controller for generating as a second texture images of environmental things except ambient light emitting sources when viewed from the object, the second controller generating as a third texture images of shadows of the environmental things which block light from the light emitting sources, of the light emitting sources and the environmental things, the second controller storing the generated second and third textures into the texture memory; and third means for reading and synthesizing the first, second and third textures stored in the texture memory, the third means mapping the synthesized texture on the object placed in the three-dimensional virtual space.

The second and third textures may be each generated with respect to the directions toward two faces in the axial direction of a virtual camera and toward four faces in the direction orthogonal to the axis of the virtual camera, in a camera coordinate system in which the object is placed so as to have forward and backward directions along the axis of the virtual camera within the three-dimensional virtual space.

Preferably, blending of colors of the first and second textures upon rendering to the video memory by the second controller is operated using an expression, $$Co=(1-a) \times Ci + a \times Ct$$

where Co is the result of operation;
Ci is the color of the first texture;
Ct is the color of the second texture; and
a is the ratio of blending.

Preferably, blending of colors of the third texture and the result Co of color blending of the first and second textures is operated using an expression, $$Co' = Co + Ct'$$

where Co' is the result of operation; and
Ct' is the color of the third texture.

The second and third textures are preferably generated at the time of a move relative to the environmental things of an object for reflection placed in the three-dimensional virtual space.

When the second controller reads the first to third textures from the texture memory, textures of positions may be read and mapped which correspond to coordinates (U, V) obtained from a reflection vector at the object for reflection relative to a line-of-sight vector in point-of-view coordinates.

The above and other objects, aspects, features and advantages of the present invention will become more apparent from the following detailed description when taken in conjunction with the accompanying drawings which follow.

DESCRIPTION OF THE PREFERRED EMBODIMENTS

An embodiment of the present invention will now be described with reference to the drawings. Although the following description of the embodiment takes a car as the object, on which the environmental texture is reflected, application of the present invention is not limited to such an embodiment.

Figure 1:
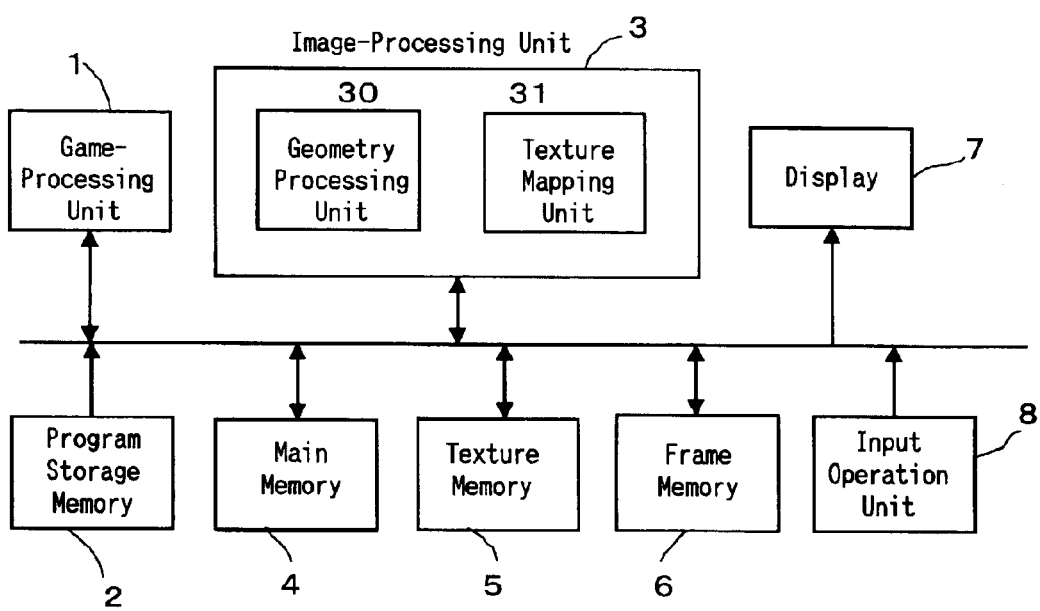
FIG. 1 is a block diagram for showing a configuration for a game machine as an image generating system applying the present invention.

FIG. 1 is a block diagram showing a configuration for a game machine as an image generating system applying the present invention.

A game-processing unit 1 has the function of the main processor, and record media including an optical disk (CD, DVD), a magneto-optic disk (MO), or hard disk embody a program storage memory 2, and an image generation program according to the present invention is stored in this program storage memory.

The game-processing unit 1 is stored in the program storage memory 2, or operates based on programs including an image generation program according to the present invention, which are transferred from a program supply source through a communication interface unit not shown, and executes the control of processing, such as gaming procedure processing, image processing, and voice source processing.

An image-processing unit 3 includes a geometry processing unit 30 and a texture-mapping unit 31. The geometry processing unit 30 performs a geometry processing, such as conversion of the local coordinate system of the object into the world coordinate system, conversion of coordinates including conversion from the world coordinate system into the viewpoint coordinate system, and further perspective conversion to the screen coordinate system.

The object data after the geometry processing has the top data including a texture data, or brightness data. This object data is stored in a work memory 4.

A texture mapping unit 31 includes a rendering processing function unit, and executes a rendering processing of the object formed with a plurality of polygons and curved surfaces, in other words, generation of texture in accordance with the present invention, rendering to the texture memory 5 (rendering), and further pasting of the texture stored in the texture memory 5 (mapping).

In such an image processing, the texture mapping unit 31 draws the object in a frame memory 6, while performing a hidden surface removal processing, according to the priority based on the object data or the texture data. The data rendered in the frame memory 6 is repeatedly read out, converted into a video signal and displayed on a display 7.

Figure 2:
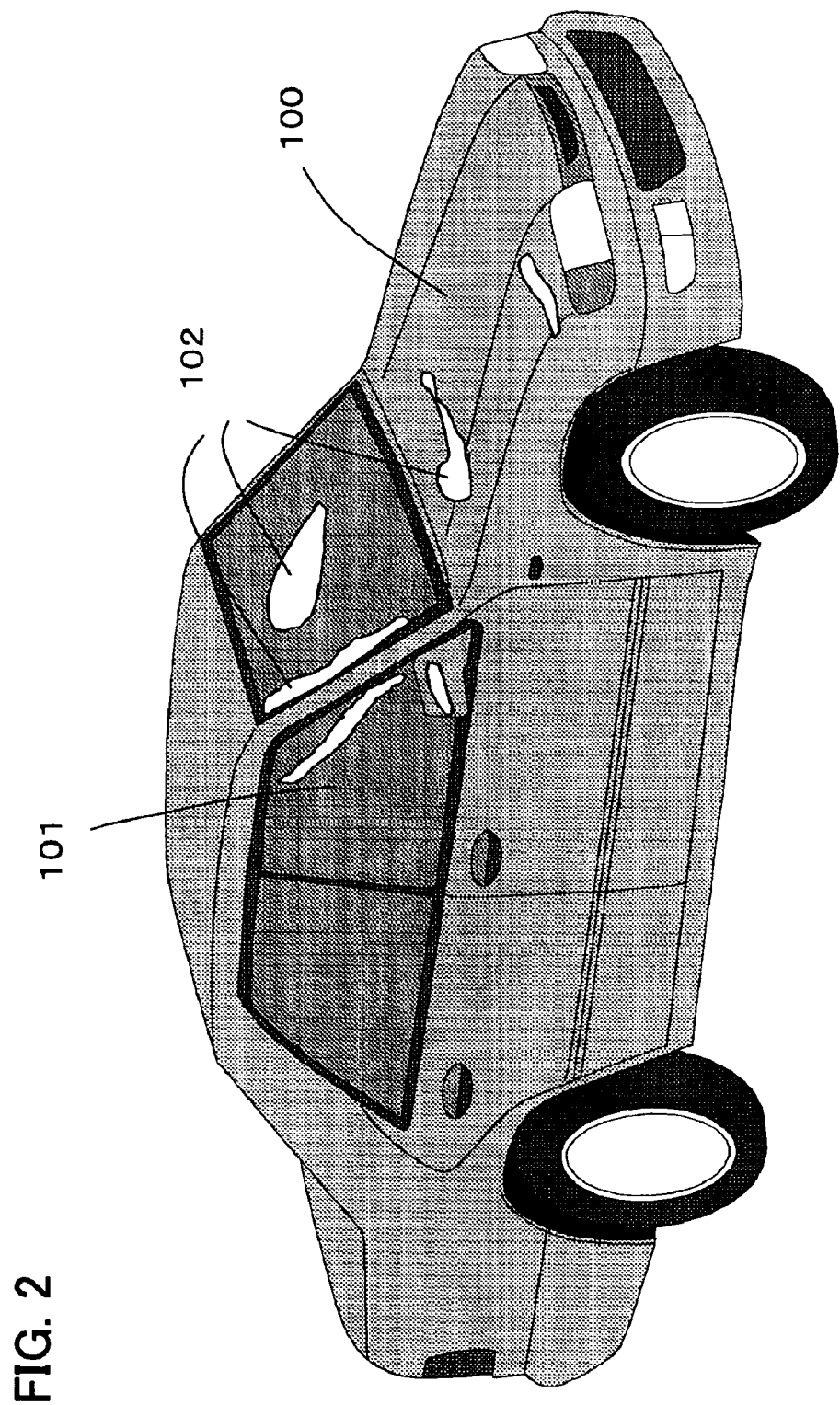
FIG. 2 is a diagram for describing an example of the image generated by an image generation method according to the present invention.

FIG. 2 is a diagram describing an example of the image generated by an image generation method according to the present invention. Shown in FIG. 2 is the image of a car, which is an object for reflecting the environmental texture. In a game machine shown in FIG. 1, the running direction and running speed of the car placed in a three-dimensional virtual space are controlled by means of the player operating the car with an input operation unit 8.

When a real car is running, the car reflects the landscape around the car, and further the light from a light emitting source, like sunlight, brightens the car body up and thus the shining surface gives a feeling of luster. The present invention gives the same effect as the state, in which a real car reflects the environment surrounding the car. By this effect, a even more higher feeling of reality can be given to the player.

In FIG. 2, the surface of a car body 100, or a surface of glass 101 reflects the surrounding environment so as to express a brightness and luster 102.

Figure 3:
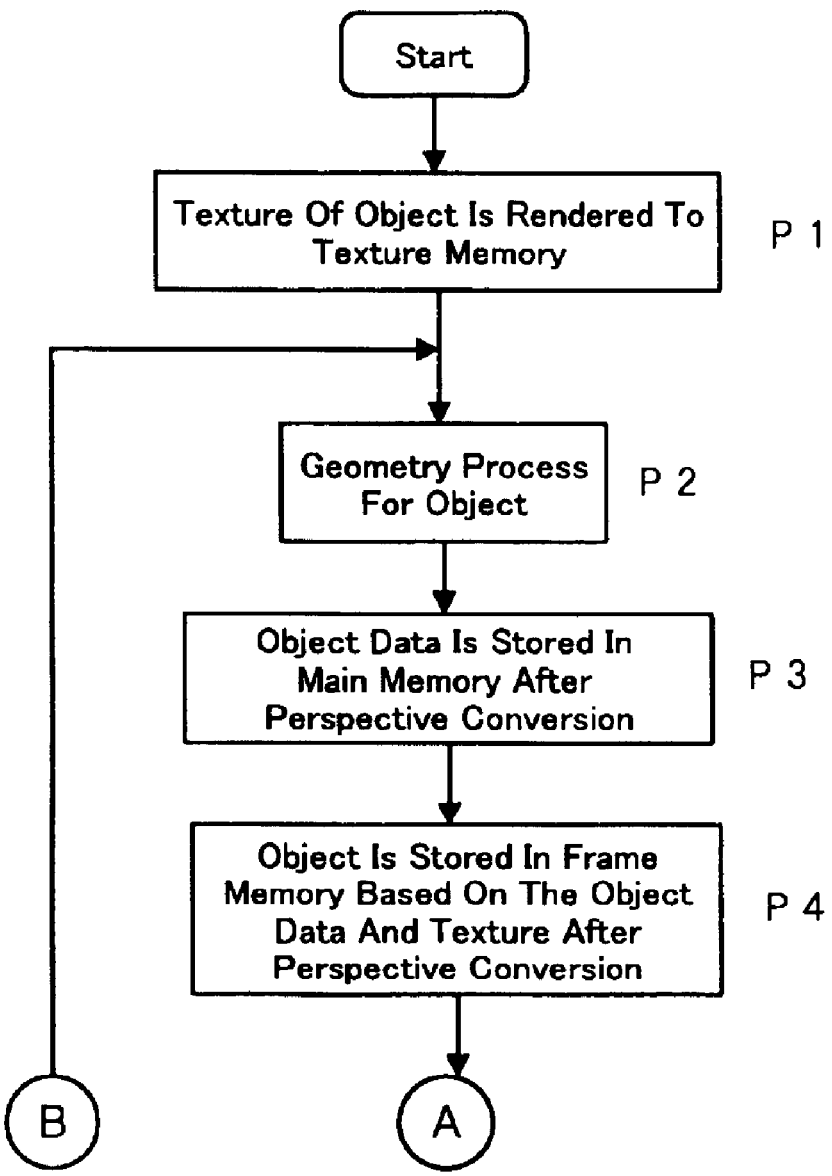
FIG. 3 is a diagram for describing an example of the image generated by an image generation method according to the present invention (1)
Figure 4:
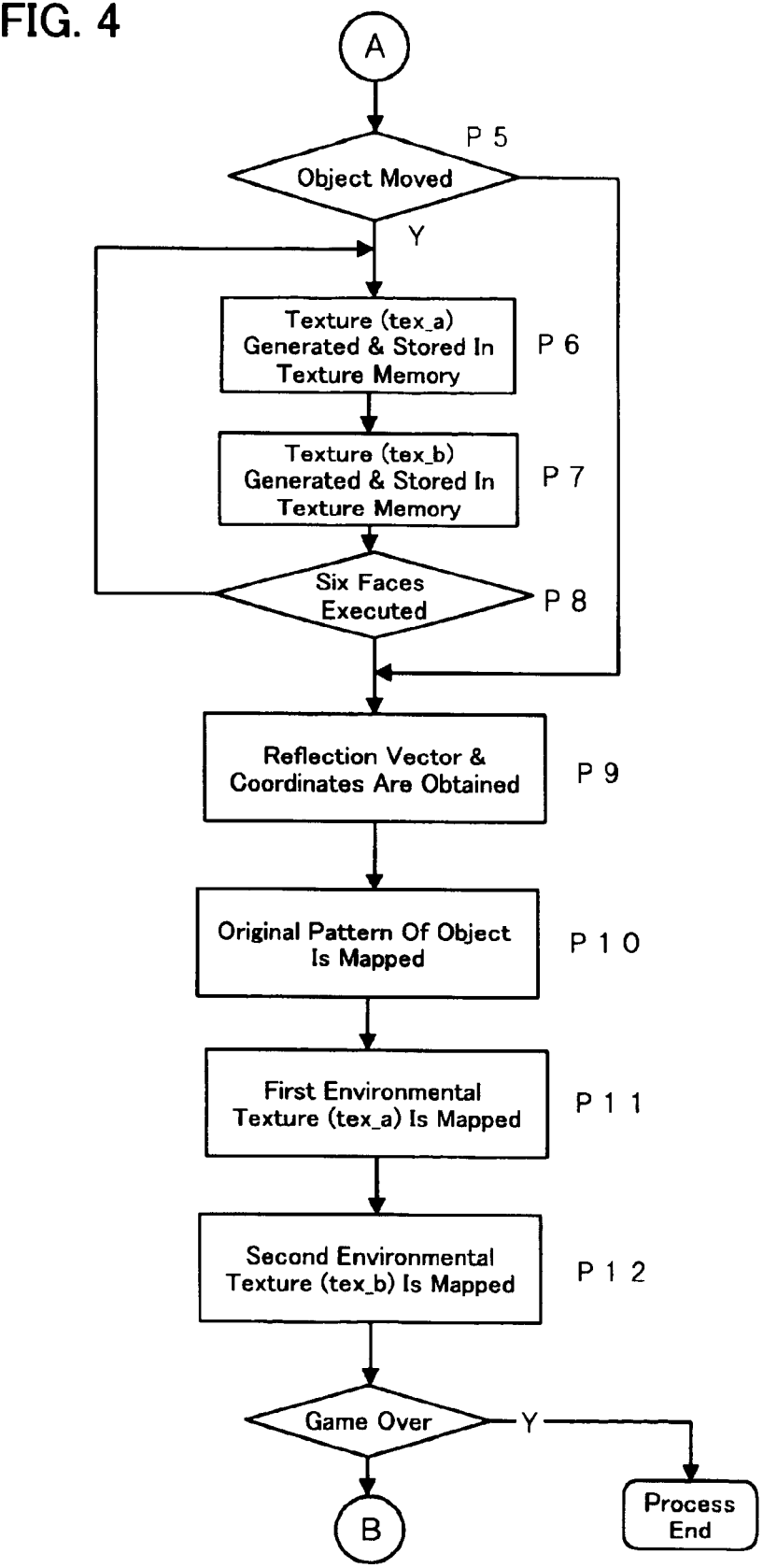
FIG. 4 is a diagram for describing an example of the image generated by an image generation method according to the present invention (2)

FIGS. 3 and 4 are diagrams showing process flows when an image generation method according to the present invention is applied to the game machine shown in FIG. 1. Procedures for generating an image as shown in FIG. 2 following the process flows shown in FIGS. 3 and 4 is described below.

In FIG. 3, when the power to the game machine is turned ON, a game program and game data, i.e., data of local coordinates of the object for reflection and the surrounding environmental things (hereinafter, these are optionally referred to as "object") are read out of a program storage memory 2, and transferred to a main memory 4 and stored there.

When the game program transferred to the main memory 4 starts a game processing, the first texture expressing the original pattern of the object for reflection, here, a car, i.e., the color of the surface of the object itself, pattern or quality by the feel of the object itself is read out of a program storage memory 2, which is a record medium, and transferred to a texture memory 5 and rendered (Processing step P1).

Next, the following process is repeatedly executed at a specified time intervals, for example, every 1/60 seconds, until the game ends.

A geometry-processing unit 30 of an image-processing unit 3 performs geometry processing of the object (Processing step P2).

Here, the data of the object already transferred to the main memory 4 has local coordinates. Accordingly, the geometry-processing unit 30 converts the local coordinates to specified three-dimensional space coordinate system in the geometry processing (processing step P2).

Next, the object data is converted into a viewpoint coordinate system with the viewpoint as the origin, which moves and changes within the three-dimensional space coordinate system as the game progresses, and further a perspective conversion is performed for seeing through the object from the viewpoint onto the coordinate system of a two-dimensional screen, corresponding to a display screen, within the viewpoint coordinate system.

The object data thus finished processing up to the perspective conversion by the geometry-processing unit 30 is stored and held in the main memory 4 (processing step P3).

Next, a texture mapping unit 31 of the image processing unit 3 pastes to the object for reflection, the first texture corresponding to the original pattern of the object for reflection which is already transferred and rendered in the texture memory 5, and renders (draws) in a frame memory 6, based on the object data after perspective conversion (processing step P4).

Here, for the sake of convenience in the following description, the texture, which means the original pattern of the object for reflection, is referred to as "first texture" or "object texture".

Then processing goes on to FIG. 4, and whether the object moved or not is judged (processing step P5). Particularly in an embodiment of the present invention, when the car which means the object for reflection moved in relation to the environmental things (processing step P5, Y), a first environmental texture (tex_a) which is the second texture, and a second environmental texture (tex_b) which is the third texture are generated.

The time when the car, which is the object for reflection, moved in relation to the environmental things means the time when at least whichever one of the object, environmental things and light emitting source moved. Because in such a case, the image, which the car reflects, is changed, here, the car means the object for reflection.

The first environmental texture (tex_a), that is the second texture, is images representing all objects except light emitting things. The second environmental texture (tex_b), that is the third texture, is the images of light emitting things and objects that likely block the light. At this time, in the second environmental texture (tex_b), that is the third texture, the objects blocking the light emitting things are rendered in black, since they block the light from the light emitting things. By this method, the shaded area blocking the light emitting things is reflected to the object for reflection as a shadow.

Figure 5:
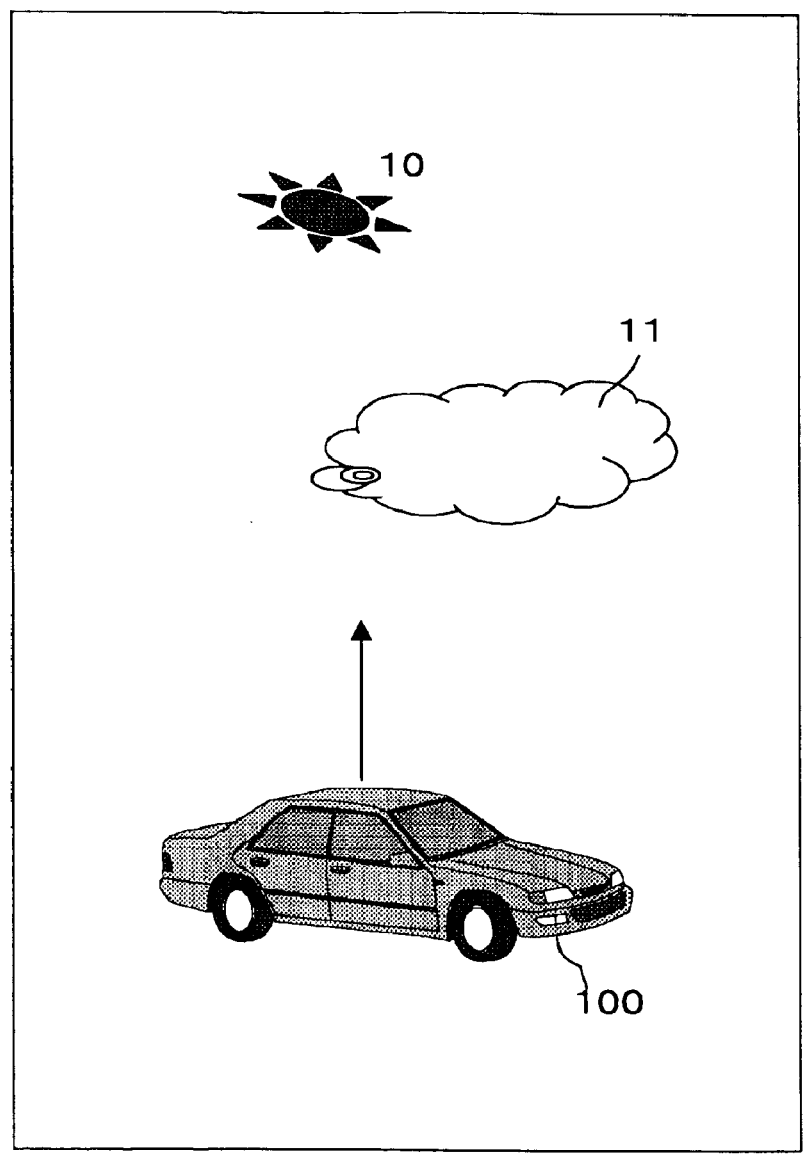
FIG. 5 is a diagram for describing a specific example of a texture (1)
Figure 6:
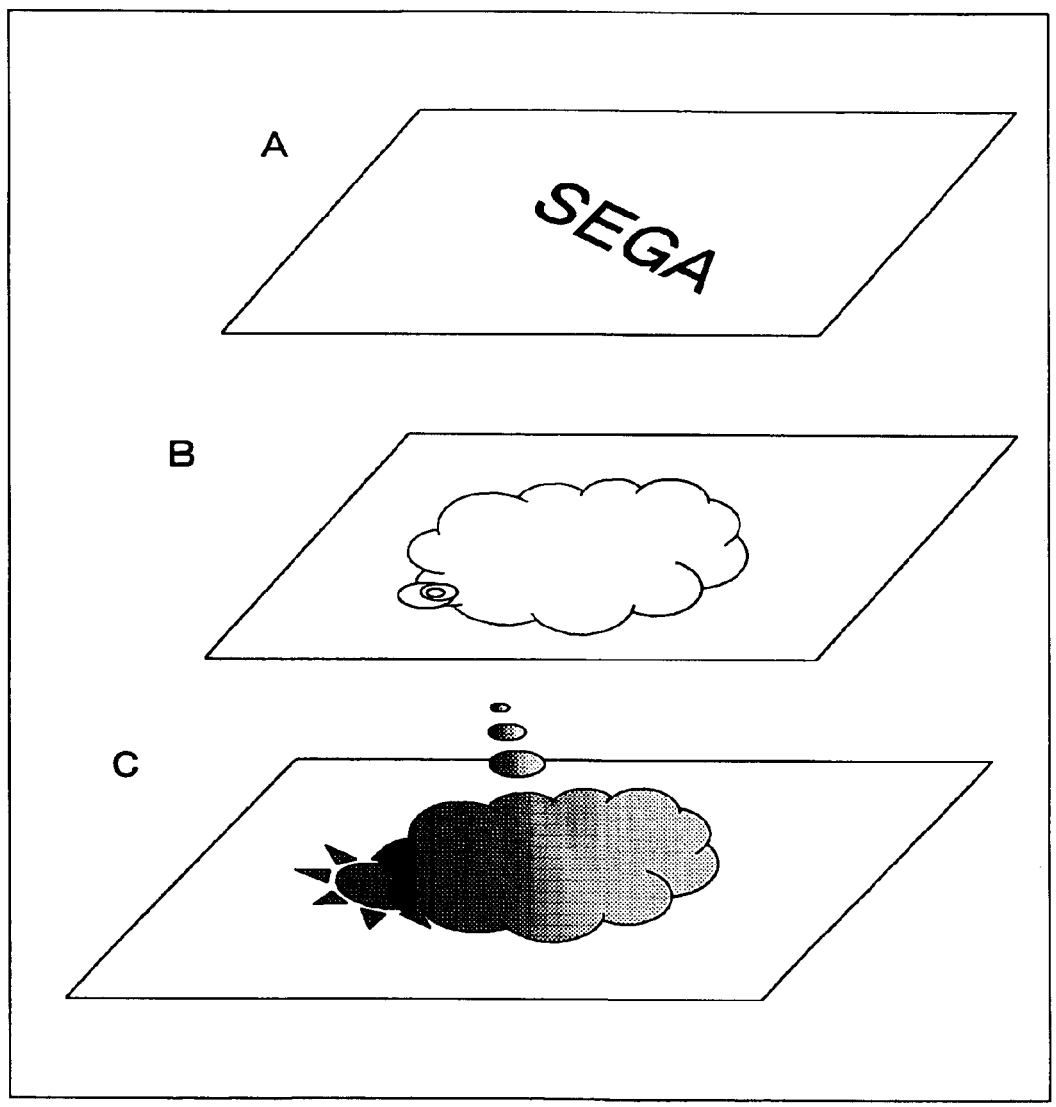
FIG. 6 is a diagram for describing a specific example of a texture (2)

Furthermore, referring to FIGS. 5 and 6, more specific description will be made. FIG. 5 shows a car 100 as the object for reflection, sunlight 10 as a light emitting thing above the car, and a cloud 11 shown as an object which may possibly block the sunlight (light emitting thing) 10.

Therefore, in FIG. 5, in the environment in the arrow direction, i.e., toward the upper direction, relative to the car 100 as the object for reflection, the first environmental texture (tex_a), that is the second texture, is an image of the cloud 11 except an image of the sun 10, and the image of the cloud 11 viewed in the arrow direction is rendered in the texture memory 5 by the processing step P6 shown in FIG. 4 (see FIG. 6B).

Furthermore, by the processing step P7 shown in FIG. 4, in the second environmental texture (tex_b) that is the third texture, the images of the sun 10 and the cloud 11, which blocks the sun and is expressed as a shadow, is rendered (rendered) to the texture memory 5 (FIG. 6C).

For the purpose of further deepening understanding, other examples of the first environmental texture (tex_a) and the second environmental texture (tex_b) are described below.

Here, an assumption is made that there would be a car as an object for reflection, and above the car, there would be a ceiling lamp as a light emitting source, and a ceiling fan as an object to block the light. In such an environment as described above, the first environmental texture (tex_a) that is the images of the objects surrounding the car, an object for reflection, except light emitting things, is the image of the ceiling fan. The second environmental texture (tex_b) is the image of the ceiling lamp, which is overshadowed by the ceiling fan blocking the light of the ceiling lamp.

Further, when an environment where a car is in a garage is assumed, an object for reflection is the car, a light source is a ceiling lamp, and objects except light emitting things are a ceiling fan, side wall in the garage and small articles placed in the garage.

Furthermore, a shield for protecting against the light source is the ceiling fan. Accordingly, the first environmental texture (tex_a) is the images of the objects except the ceiling lamp that is a light source, i.e., the images of the ceiling fan, side wall in the garage, and small articles placed in the garage. In the second environmental texture (tex_b), objects, which possibly block the light source, are the ceiling lamp, and further beams in the garage, and the second environmental texture is the shadows of these objects and the image of the ceiling lamp.

Also, such an environment is assumed that a car is running on a road during the day time under the clear sky, an object for reflection is the car, a light source is the sun, and objects except the light source are the images of all things in the town, such as buildings, roadside trees, the sky, roads, etc. Further, things that block the light source are buildings, roadside trees, etc.

Accordingly, the first environmental texture (tex_a) is the images of all things in the town, such as buildings, roadside trees, the sky, roads, etc., and the second environmental texture (tex_b) is the images, which treats buildings, roadside trees, etc. as shadows.

Referring back to FIG. 4, processing of the above-mentioned processes P6 and P7 are repeatedly executed for 6 faces (processing step P8). In other words, in FIG. 5, only the upward direction of the car, an object for reflection, is mentioned, however, in the present invention, the first environmental texture (tex_a), that is the second texture, and the second environmental texture (tex_b), that is the third texture, are generated as to 6 faces of the object for reflection.

Figure 7:
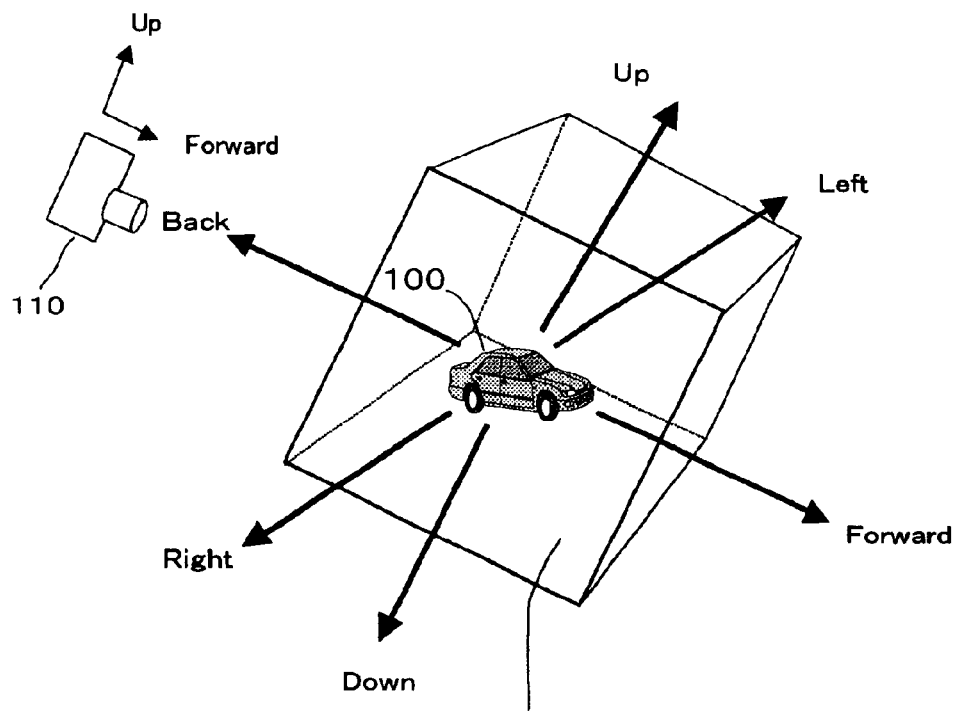
FIG. 7 is a diagram for describing that a first environmental texture (tex_a) and a second environmental texture (tex_b) for 6 faces are generated.

FIG. 7 is a diagram describing this, and an object for reflection 100 is placed in a camera coordinate system 111 with a virtual camera 110 as a viewpoint. At this time, the object for reflection 100 is placed so that the object has the forward direction (Forward) and the backward direction (Back) along the camera axis of the virtual camera 110.

Likewise, the processes P6 and P7 are processed as to 6 faces, in other words, two faces against the forward direction (Forward) and the backward direction (Back), and in addition, four faces in a vertical direction to the axis of the virtual camera, in other words, vertical upward direction (Up), vertical downward direction (Down), vertical right-hand direction (Right), and vertical left-hand direction (left). Accordingly, the first environmental texture (tex_a) and the second environmental texture (tex_b) are generated for the object for reflection 100, as to the above-mentioned 6 faces.

When the generation of the first environmental texture (tex_a) and these second environmental texture (tex_b) for 6 faces, and rendering to the texture memory 5 are finished, then, mapping of the texture onto the object for reflection is performed.

Here, a reflection vector in the object for reflection to a vector from the viewpoint in the viewpoint coordinates is obtained, and coordinates (U, V) of the texture memory 5 to the reflection vector is obtained (processing step P9).

First, according to the obtained coordinates (U, V), the object texture, that is the original pattern of the object for reflection rendered in the texture memory 5 at the processing step P4 is read out, and mapped to the object (processing step P10). Now, if the original pattern of the object for reflection is supposed to be the texture shown in FIG. 6A, this pattern is mapped as the first texture.

Then, the first environmental texture (tex_a), that is the object for reflection and the second texture, is mapped (processing step P11, see FIG. 6B).

At this time, operation for blending the colors of the first texture and the second texture is performed by means of using the following equation:

$$Co=(1-a)\times Ci+a\times Ct$$

where,
Co is the color of the operation result;
Ci is the color of the first texture;
Ct is the color of the second texture (tex_a); and
a is the blending ratio.

Here, by means of changing the blending ratio "a" in relation to the progress of the program, a reflecting degree of the surrounding environment except light sources can be changed.

Next, for the resultant color of blending the color of the first texture, that is the original pattern of the object for reflection, and the color of the first environmental texture (tex_a), that is the second texture, as performed in the above-mentioned processing step P11, the second environmental texture (tex_b), that is the third texture, is mapped to the object for reflection, by means of using the following equation (processing step P12, see FIG. 6B):

$$Co'=Ci'+Co$$

Where
Co' is the color of operation result;
Co is the color as the result of blending the first and the second textures; and
Ci' is the color of the third texture.

Figure 8:
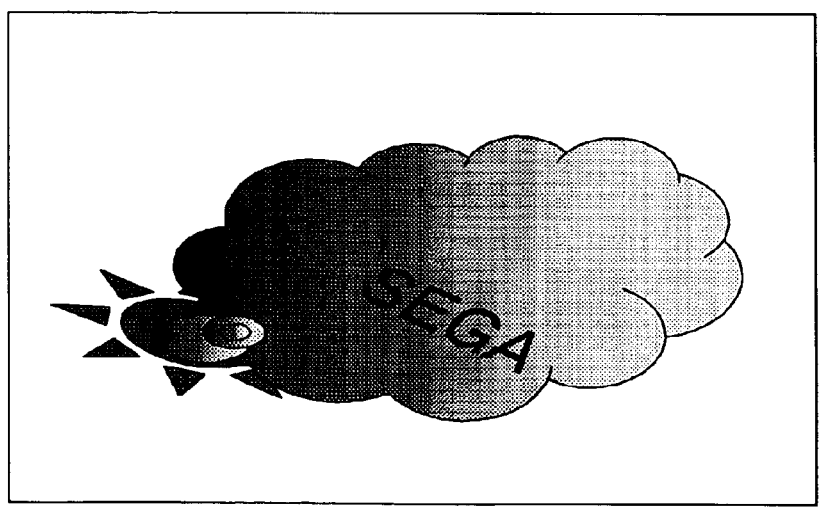
FIG. 8 is a diagram for describing a finished mapping state.

FIG. 8 is a diagram showing the mapping state after finishing up to the processing step P12, in the case when FIG. 6A shows the first object texture, that is the original pattern of the object, and FIG. 6B shows the first environmental texture (tex_a), that is the second texture of the images of all objects except light sources, and the second environmental texture (tex_b) is the third texture, that is the images of the light source and things blocking the light source that are expressed as shadows.

By this method, the object, to which the texture is mapped, produces areas with high brightness and these areas become the highlight parts, thus luster can be expressed.

As set forth hereinabove of the embodiment, according to the present invention, it is possible to promptly and really reflect the environment on the object depending on changes with time. Also, an image generating system and an image generation method can be provided which can express even more real luster on the object regarding the reflection of light sources.

While illustrative and presently preferred embodiments of the present invention have been described in detail herein, it is to be understood that the inventive concepts may be otherwise variously embodied and employed and that the appended claims are intended to be construed to include such variations except insofar as limited by the prior art.

What is claimed is:

1. An image generating system comprising:
  a texture memory storing therein textures to be mapped on the surface of an object placed in a three-dimensional virtual space;
  a first controller reading original patterns of the object as a first texture from a record medium, and storing the read first texture into the texture memory;
  a second controller generating as a second texture images of environmental things except ambient light emitting sources when viewed from the object, and generating as a third texture images of the light emitting sources and shadows of certain environmental things, which block light emitted from the light emitting sources among the environmental things, and storing the generated second and third textures into the texture memory; and
  a third controller reading and synthesizing the first, second and third textures stored in the texture memory, and mapping the synthesized texture on the object placed in the three-dimensional virtual space;
  wherein the second and third textures are generated at the time of a move relative to the environmental things of an object for reflection placed in the three-dimensional virtual space.

2. The image generating system according to claim 1, wherein the second and third textures are each generated with respect to the directions toward two faces in the axial direction of a virtual camera and toward four faces in the direction orthogonal to the axis of the virtual camera, in a camera coordinate system in which the object is placed so as to have forward and backward directions along the axis of the virtual camera within the three-dimensional virtual space.

3. The image generating system according to claim 1, wherein blending of colors of the first and second textures upon rendering to the video memory by the second controller is operated using an expression, $$Co=(1-a)\times Ci+a\times Ct$$

where
  Co is the result of operation;
  Ci is the color of the first texture;
  Ct is the color of the second texture; and
  a is the ratio of blending; and
wherein blending of colors of the third texture and the result Co of color blending of the first and second textures is operated using an expression, $$Co'=Co+Ct'$$

where
  Co' is the result of operation; and
  Ct' is the color of the third texture.

4. An image generating system according to claim 1, wherein when the second controller reads the first to third textures from the texture memory, textures of positions are read and mapped which correspond to coordinates (U, V) obtained from a reflection vector at the object for reflection relative to a line-of-sight vector in point-of-view coordinates.

5. A method for generating images for use in an image generating system having a texture memory storing textures to be mapped on an object for rendering to a video memory, the program comprising:
  storing in a texture memory the textures to be mapped on the surface of the object placed in a three-dimensional virtual space;
  reading out original patterns of the object as a first texture from a record medium, to store the read out first texture into the texture memory;
  generating as second texture images of environmental things except ambient light emitting sources when viewed from the object;

generating as third texture images of the light emitting sources and shadows of the environmental things, which block light from the light emitting sources among the environmental things, to store the generated second and third textures into the texture memory; and reading out and synthesizing the first, second and third textures stored in the texture memory, and mapping the synthesized texture on the object placed in the three-dimensional virtual space;

wherein the second and third textures are generated at the time of a move relative to the environmental things of an object for reflection placed in the three-dimensional virtual space.

6. The method according to claim 5, wherein the second and third textures are each generated with respect to the directions toward two faces in the axial direction of a virtual camera and toward four faces in the direction orthogonal to the axis of the virtual camera, in a camera coordinate system in which the object is placed so as to have forward and backward directions along the axis of the virtual camera within the three-dimensional virtual space.

7. The method according to claim 5, wherein blending of colors of the first and second textures upon rendering to the video memory is operated using an expression, $$Co=(1-a) \times Ci + a \times Ct$$

where
- $Co$ is the result of operation;
- $Ci$ is the color of the first texture;
- $Ct$ is the color of the second texture; and
- $a$ is the ratio of blending; and wherein blending of colors of the third texture and the result $Co$ of color blending of the first and second textures is operated using an expression, $$Co' = Co + Ct'$$

where
- $Co'$ is the result of operation; and
- $Ct'$ is the color of the third texture.

8. A program according to claim 5, wherein when the first to third textures are read out from the texture memory, textures of positions are read and mapped which correspond to coordinates (U, V) obtained from a reflection vector at the object for reflection relative to a line-of-sight vector in point-of-view coordinates.

* * * * *